May 22, 1962

F. H. PAGE, JR 3,036,199

RESISTANCE WELDING HEAD

Filed July 28, 1959

INVENTOR.
FRANKLIN H. PAGE, JR.
BY
Christie, Parker & Hale
ATTORNEYS.

May 22, 1962 F. H. PAGE, JR 3,036,199
RESISTANCE WELDING HEAD
Filed July 28, 1959 4 Sheets-Sheet 2

INVENTOR.
FRANKLIN H. PAGE, JR.
BY
Christie, Parker & Hale
ATTORNEYS.

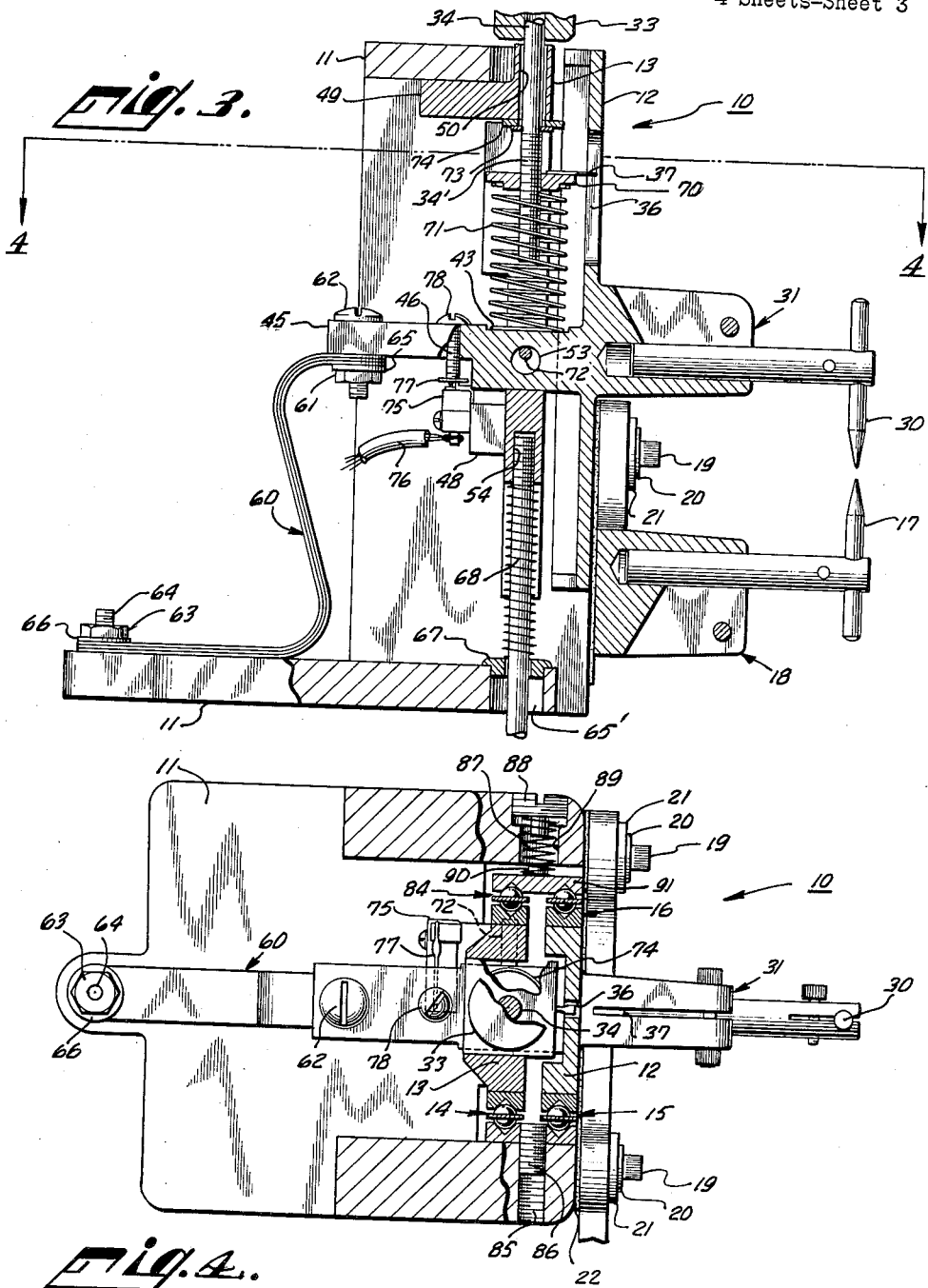

May 22, 1962 F. H. PAGE, JR 3,036,199
RESISTANCE WELDING HEAD
Filed July 28, 1959 4 Sheets-Sheet 4

INVENTOR.
FRANKLIN H. PAGE, JR.
BY
Christie, Parker & Hale
ATTORNEYS.

United States Patent Office 3,036,199
Patented May 22, 1962

3,036,199
RESISTANCE WELDING HEAD
Franklin H. Page, Jr., Arcadia, Calif., assignor to Du Pa Co., Inc., Arcadia, Calif., a corporation of California
Filed July 28, 1959, Ser. No. 830,059
6 Claims. (Cl. 219—86)

This invention relates to resistance welding heads of the spot welding type and, more particularly, relates to an improvement in such resistance welding heads.

A resistance welding head of the spot welding type, in which a first electrode is supported in a fixed position and a second electrode is mounted on a carrier head which is movable with respect to the first electrode, is described in U.S. Patent No. 2,872,564 of Armand F. Du Fresne and Franklin H. Page, Jr., issued February 3, 1959, and assigned to Du Pa Co., Inc., the assignee of the present application. In this welding head, the two electrodes contact opposite sides of the pieces of work which are to be welded, the work being disposed between the electrodes. A force is applied to the movable electrode so as to urge it against the work. When this force reaches a preselected magnitude, a switch is actuated which completes an electrical welding circuit. Welding current then flows between the electrodes and through the work, and welding occurs at the precise electrode force appropriate for a proper weld.

While the welding head described in the aforesaid patent is of great utility in spot welding, the structure illustrated therein has a comparative disadvantage for certain applications in that the motion of the electrode is not strictly linear but rather is arcuate. While the head itself moves linearly, the electrode is pivoted on the head. Therefore, upon movement of the movable electrode in response to contacting the work to be welded, a slight radial displacement occurs. For operations such as the welding of small or delicate wires as, for example, are used in the internal structure of transistors, this slight radial displacement is undesirable.

According to the present invention, absolutely linear movement of the movable electrode is achieved by utilizing a carrier slide to hold a movable electrode rigidly with respect to radial displacement, and a drive slide, to transmit a moving force to the carrier slide. The drive and carrier slides are restrained in their motion to a linear reciprocal motion, and, therefore, the movable electrode, which is attached to the carrier slide, can move only in a linear manner. In order to embody the advantage described in the aforesaid patent of selecting the electrode-work contacting force at which welding occurs, means are provided in the present invention to allow relative movement between the two slides when a force of a preselected magnitude exists therebetween, which movement actuates a switch to initiate welding. In addition, means are provided for selectively varying the magnitude of the force required to initiate the relative motion between the slides. Thus, there may be employed in each instance the force required for proper welding in the particular situation.

The invention may be more readily understood by referring to the accompanying drawings in which:

FIG. 3 is a sectional elevation of the welding head of FIG. 1;

FIG. 4 is a sectional view taken along lines 4—4 of FIG. 3;

Figure 1:
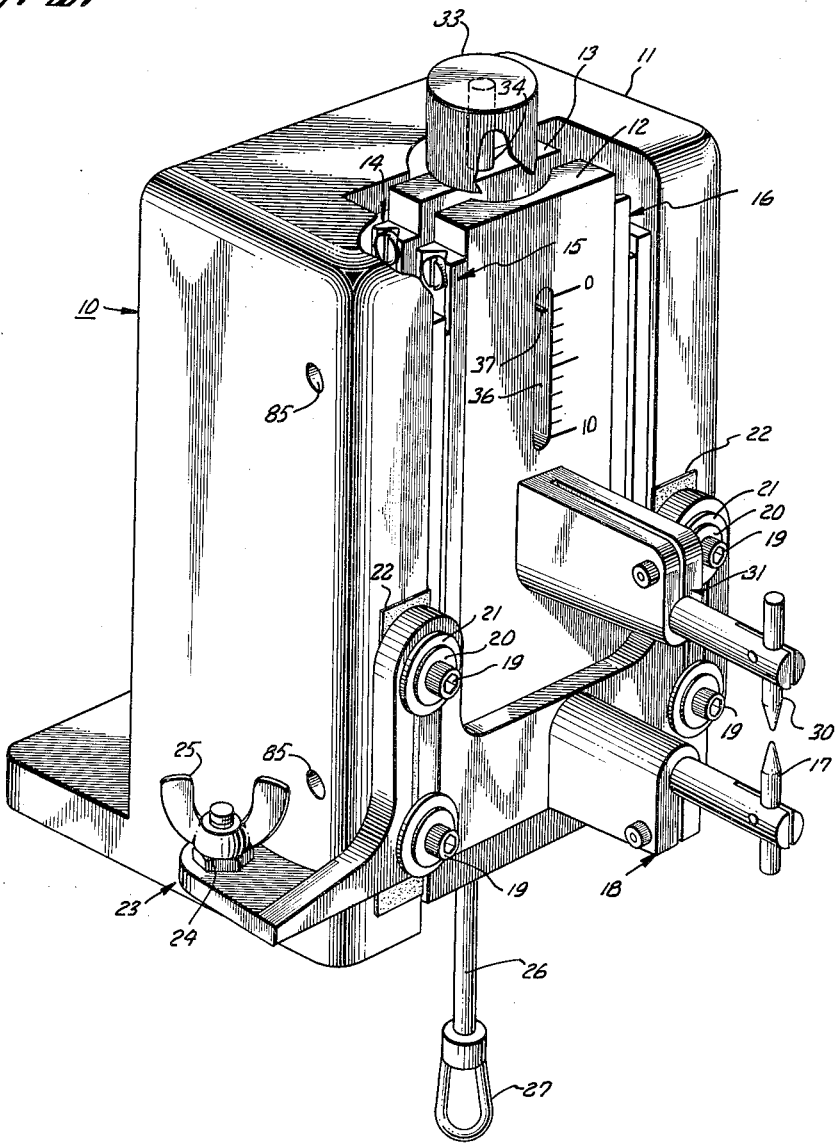
FIG. 1 is a perspective view of the assembled welding head.

Referring now to FIG. 1, there is shown a welding head 10 consisting of a housing 11, a carrier slide 12, and a drive slide 13. The housing 11 has been partially broken away to illustrate the means by which antifriction members, which, for example, may consist of ball bearing assemblies 14, 15, 16 (FIG. 1), and 84 (FIG. 4), are attached to the housing 11 and the slides 12 and 13. The slides 12 and 13 may thus move freely with a linear reciprocal motion with respect to the housing 11 and a first electrode 17. The first electrode 17 is held by an electrode holder 18 which is connected to the housing 11 by means of four bolts 19. Holding washers 20, insulating washers 21, and insulating strips 22, together with the bolts 19, connect the holder 18 to the housing 11 while providing electrical insulation between the housing 11, which is preferably of metal, and the electrode holder 18 and first electrode 17. The electrode holder 18 has a terminal 23, including a hex nut 24 and a wing nut 25. The terminal 23 is used to provide one electrical terminal for the welding circuit. A second electrode 30 is connected to the carrier slide 12 by an electrode holder 31.

A drive slide rod 26 and a drive slide shaft connector 27 are utilized to connect the drive slide 13 to a source of a displacing force (not shown). A relative motion force-adjusting knob 33 is connected to a relative motion force-adjusting shaft 34 extending from the upper surface of the drive slide 13. The carrier slide 12 has an aperture 36 extending therethrough, adjacent which are indicia markings. A relative motion force indicator 37 extends into the aperture 36 of the carrier slide.

Figure 2:
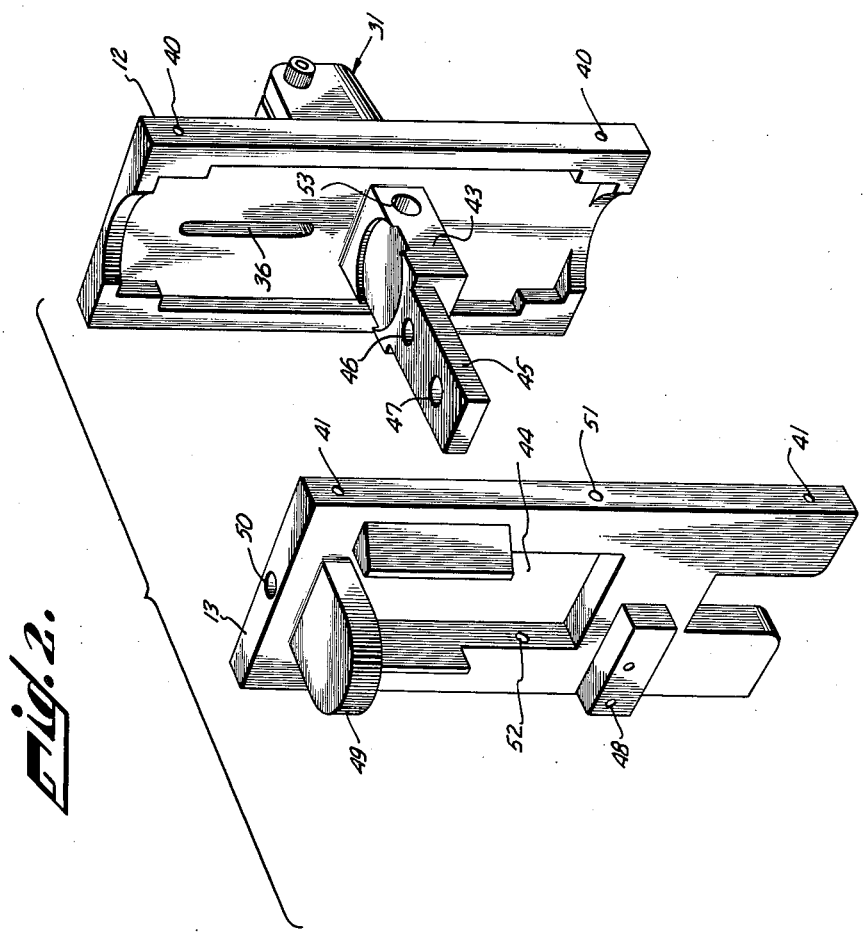
FIG. 2 is an exploded view in perspective of the carrier slide and the drive slide without their accompanying attachments.

FIG. 2 is an exploded perspective view of the carrier slide 12 and the drive slide 13. Two threaded bores 40, on either side of the carrier slide 12, are utilized in conjunction with conventional bolts to fix the races of the ball bearing assemblies 15, 16 to the carrier slide 12. Similarly, threaded bores 41 on the drive slide 13 are used to fix the races of the ball bearing assemblies 14 and 84 (see FIG. 4) thereto. The carrier slide 12 has a spring seat 43 which, when the slides are assembled, extends through a large rectangular aperture 44 of the drive slide 13. The spring seat 43 has an extension 45 extending therefrom. The extension 45 has a first threaded bore 46 and a second threaded bore 47 extending therethrough. The drive slide 13 has a switch mounting lug 48 immediately below the aperture 44, and a stop lug 49 adjacent the opposite extremity of the aperture 44. A cylindrical bore 50 extends vertically from the upper surface of the drive slide 13 into the aperture 44 and contains the force-adjusting rod 34 (FIG. 1). A pair of bores 51, 52 extend laterally through the sides of the drive slide 13 into the aperture 44. A comparatively larger diameter bore 53 extends through the lower portion of the spring seat 43 of the carrier slide 12 and, when the slides are assembled, is aligned with the bores 51 and 52 of the drive slide 13.

FIG. 3 is a sectional view of the assembled welding head of FIG. 1. The drive slide rod 26 is attached to the drive slide 13 by means of a threaded bore 54. The spring seat extension 45 has a grounding strap 60 attached thereto by means of a nut 61 and a bolt 62. The grounding strap 60, at its other end, is connected to the housing 11 by a nut 63 and a bolt 64. Washers 65 and 66 on the nut-bolt combinations insure a permanent connection. The drive slide rod 26 is passed through the housing 11 by means of an aperture 65' which has a retaining washer 67 retained thereon. The drive slide rod 26 engages the threaded bore 54 of the drive slide 13 so as to make a permanent connection therewith. A return spring 68 is seated between the drive slide 13 and the retaining washer 67 about the drive slide rod 26. The return spring 68 functions to insure that the stop lug 49 of the drive slide 13 rides against the upper portion of the housing 11 in the absence of a displacing force being applied to the drive slide rod 26.

The force-adjusting shaft 34 extends through the upper cylindrical bore 50 of the drive slide 13 and has a threaded portion 34' on which is threaded a spring retainer 70. A relative motion control spring 71 is seated between the spring seat 43 of the drive slide 13 and the spring retainer 70 and encloses the force-adjusting shaft 34. By rotating the force-adjusting shaft 34 by means of the shaft knob 33, the spring retainer 70 is moved up or down the threaded tension-adjusting portion 34'. Thus the compression applied by the relative movement control spring 71 to the carrier slide 12 is selectively varied to any compression as may be desired to be preselected for the welding operation.

A dowel 72 extends through the spring seat bore 53 and also through the bores 51 and 52 (FIG. 2) of the drive slide 13. The dowel 72 connects the drive slide 13 rigidly to the ball bearing races 14 and 17 (FIG. 4) due to the tight fit between the dowel 72 and the bores 51 and 52. However, the spring seat bore 53 of the carrier slide 12 is much larger than the dowel 72. The upper portion of the spring seat bore 53 is normally urged against the dowel 72 by the action of the relative motion control spring 71. When the force existing between the carrier slide 12 and the drive slide 13, due to the force applied to the drive slide rod 26 being counteracted by the second electrode 30 contacting the work to be welded, is greater than the force exerted by the relative motion control spring 71, the drive slide 13 moves downward with respect to the carrier slide 12. The limit of this downward movement is fixed by the point at which the dowel 72 contacts the lower portion of the spring seat bore 53.

A snap ring 73 and snap ring washer 74 are mounted at the extremity of the tension-adjusting shaft threaded portion 34' adjacent the tension-adjusting knob 33 and serve to limit the upward travel of the tension-adjusting shaft 34. A small snap-action switch 75 is mounted on the switch mounting lug 48 and has a pair of leads 76 extending therefrom. The small snap-action switch 75 has a switch arm 77 which contacts a switch set screw 78 threaded in the first threaded bore 46 of the spring seat extension 45.

FIG. 4 is a sectional view taken along line 4—4 of FIG. 3. A fourth ball bearing assembly 84, which was referred to with respect to FIG. 1, is shown adjacent the ball bearing assembly 16. A pair of vertically aligned threaded bores 85 (only one shown in FIG. 4) extend through one side of the housing 11. Each of the threaded bores 85 contains a bolt 86 which extends through, and engages, the adjacent races of the ball bearing assemblies 14 and 15. The ball bearing assemblies 16 and 84 on the opposite side of the housing 11 are held in position by means of a pair of vertically aligned compression springs 87 (only one shown in FIG. 4) and a pair of compression spring-adjusting screws 88 (only one shown in FIG. 4), which are inserted in a pair of bores 89, only one bore 89 being shown. A dowel 90 pivotally connects a common race 91 of the ball bearing assemblies 16 and 84 to the housing 11. The use of this pivotal connection permits the ball bearing assemblies 16 and 84 to be accurately aligned with respect to the ball bearing assemblies 14 and 15. Thus, absolutely linear movement is assured for the slides 12 and 13. The compressive force exerted by the compression springs 87 is adjusted to be greater than the greatest deflection moment applied to the head 10 by external forces, thus maintaining the alignment of the ball bearing assemblies 16 and 84 with the ball bearing assemblies 14 and 15. The use of the spring 87 prevents changes in the compression which would otherwise result from expansion or contraction of the metal components caused by ambient temperature changes.

The application of a downward force to the drive slide rod 26 causes the drive slide 13 and the carrier slide 12 to move downward in response thereto. When the slides 12 and 13 have moved a distance such that the work which has been inserted between the two electrodes 17 and 30 is contacted thereby, the electrode 30 and, therefore, the carrier slide 12, can move no further in a downward direction. However, the drive slide 13 remains free to move in response to an additional force applied to the drive slide rod 26 which is sufficient to overcome the compression of the relative motion contact spring 71, to the extent that such movement is allowed by the corresponding movement of the dowel 72 in the spring seat bore 53 to contact the lower portions thereof. Thus it will be seen that the electrode 30 contacts the work with an initial force which is comparatively small, and that this contacting force increases as additional force is applied to the drive slide to initiate relative motion, until such time as the force applied by the electrode 30 to the work is equal to the pressure of the spring 71 resisting relative motion between the drive slide 13 and carrier slide 12, at which point relative motion between the slides 12 and 13 occurs.

Relative movement of the drive slide 13 with respect to the carrier slide 12 moves the switch set screw 78 and, therefore, the small snap-action switch arm 77, with respect to the small snap-action switch 75. The small snap-action switch 75 is thereby actuated. Actuation of the switch 75 causes an electrical welding circuit to be energized between the electrodes 17 and 30, the housing 11 and the first electrode holder 18 and its terminal 23 in conjunction with a source of electrical welding power (not shown). Such an electrical welding power source and switch circuit is illustrated in the aforesaid U.S. Patent No. 2,872,564.

Figure 6:
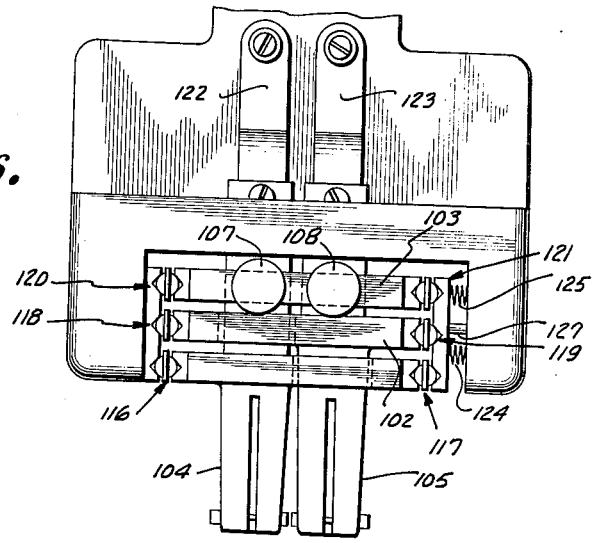
Figure 5:
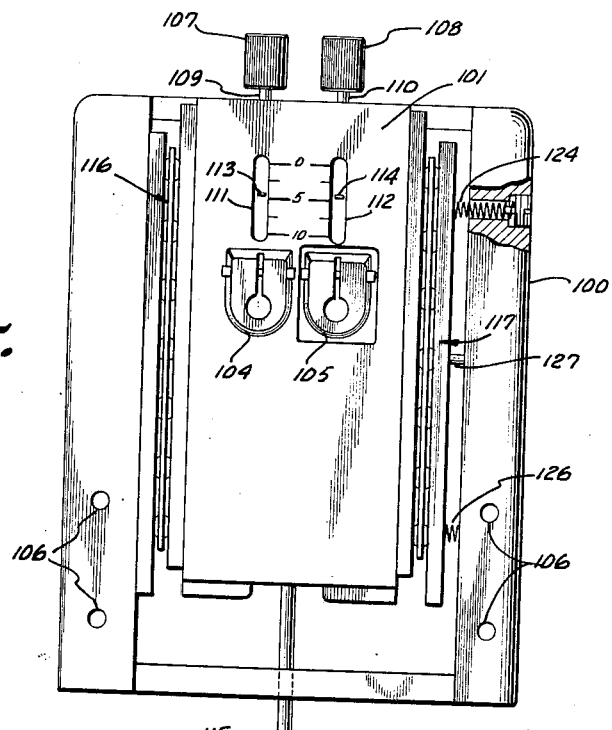
FIG. 5 is a front elevation of a dual welding head according to the invention; and, FIG. 6 is a partial plan view of the dual welding head of FIG. 5.

FIG. 5 is a front elevation of a dual welding head according to the invention. The head consists of a housing 100 which holds a first carrier slide 101, a second carrier slide 102 (FIG. 6), and a drive slide 103 (FIG. 6). The first carrier slide 101 has an electrode holder 104 connected thereto. The second carrier slide 102 has an electrode holder 105 connected thereto. The electrode holder 105 extends through and is electrically insulated from the first carrier slide 101. When dual welds are to be made, a pair of lower electrodes (not shown) are held in place by a lower electrode holder (not shown) similar to the first electrode holder 18 of FIG. 1, but being adapted to hold the two electrodes in position opposite the electrodes held by the electrode holders 104 and 105. Four threaded bores 106 provide means by which the lower electrode holder is connected to the housing 100 in a manner similar to that described with respect to FIG. 1. Alternately, a grounding plate may be used instead of the two lower electrodes.

Two force-adjusting knobs 107 and 108 and two force-adjusting shafts 109 and 110, provide means for separately adjusting the force required on the first and second carrier slides 101 and 102, respectively, in order to initiate relative motion between the individual carrier slides 101 and 102 and the drive slide 103 when their respective electrodes contact the work to be welded. The first carrier slide 101 has two apertures 111 and 112 extending therethrough with indicia markings alongside thereof. Two force indicators 113 and 114, one in each of the apertures 111 and 112, indicate the setting of force-adjusting mechanisms associated with the carrier slides 101 and 102 in a manner similar to that described with respect to FIGS. 1–4. A drive slide rod 115 is connected to the drive slide 104 in the same manner as described with respect to the embodiment of FIGS. 1–4.

FIG. 6 is a plan view of the dual head of FIG. 5. The first and second carrier slides 101 and 102 and the drive slide 103 are held in position so as to be limited to linear reciprocal movement by ball bearing assemblies 116, 117, 118, 119, 120 and 121. The ball bearing assemblies 116–121 are fixed to the housing 100 in the same manner as was described with respect to the embodiment of FIGS. 1–4, except that the carrier slides are insulated from the housing 100, the drive slide 103, and each other, if it is desired to provide separate electrical circuits for each of the electrodes. Two straps 122 and 123 complete the electrical circuits between the power supply (not shown) and the electrode holders 104 and 105. The ball bearing assemblies 117, 119, 121 are held in position and compressed by four compression spring and compression spring adjusting screw combinations 124, 125 (FIG. 6), 126 (FIG. 5), the fourth not being shown, and a dowel 127, in the same manner as described with respect to FIGS. 1–4.

The embodiment of FIGS. 5 and 6 functions in essentially the same manner as the device of FIGS. 1–4. However, the device of FIGS. 5 and 6 is utilizable to simultaneously weld together three pieces of work. This process is described in my co-pending U.S. patent application No. 754,245, filed August 11, 1958, now Patent No. 2,969,453. In that application, there is described the apparatus and process by which a novel dual-head resistance welder is constructed and operated. The device of FIGS. 5 and 6 of the present application is similarly operable and has the same advantages over the device of my aforesaid co-pending application as were described with respect to the device of FIGS. 1–4 as compared to the aforesaid U.S. Patent No. 2,872,564.

I claim:

1. In a resistance welding assembly, the combination of a welding head, a carrier slide, means connecting the carrier slide to the head so that the carrier slide can only move with a linear reciprocal motion with respect to the head, a drive slide, means connecting the drive slide to the head so that the drive slide can only move with a linear reciprocal motion with respect to the head, resilient means disposed between the carrier slide and the drive slide and having a preselected force urging the carrier slide and drive slide to move in opposite directions, means adapted to the drive slide for applying a force opposed to the preselected force, means releasably joining the carrier slide and the drive slide to provide combined movement thereof upon application of the opposing force until said opposing force exceeds said preselected force, means enabling further movement of the drive slide relative to the carrier slide when said opposing force exceeds said preselected force, and means in a welding circuit and adapted to the drive slide to energize said circuit upon said further movement of the drive slide.

2. In a resistance welding assembly, the combination of a welding head, a carrier slide, means connecting the carrier slide to the head so that the carrier slide can only move with a linear reciprocal motion with respect to the head, a drive slide, means connecting the drive slide to the head so that the drive slide can only move with a linear reciprocal motion with respect to the head, resilient means disposed between the carrier slide and the drive slide and having a preselected force urging the carrier slide and drive slide to move in opposite directions, means engaging the resilient means for adjusting the magnitude of the preselected force, means adapted to the drive slide for applying a force opposed to the preselected force, means releasably joining the carrier slide and the drive slide to provide combined movement thereof upon application of the opposing force until said opposing force exceeds said preselected force, means enabling further movement of the drive slide relative to the carrier slide when said opposing force exceeds said preselected force, and means in a welding circuit and adapted to the drive slide to energize said circuit upon said further movement of the drive slide.

3. In a resistance welding assembly, the combination of a welding head, a first electrode fixed to the head, a carrier slide, a second electrode attached to the carrier slide, at least one antifriction member connecting the carrier slide to the head so that the carrier slide can only move with a linear reciprocal motion with respect to the first electrode, a drive slide, at least one antifriction member connecting the drive slide to the head so that the drive slide can only move with a linear reciprocal motion with respect to the first electrode, resilient means disposed between the carrier slide and the drive slide and having a preselected force urging the carrier slide and drive slide to move in opposite directions, means adapted to the drive slide for applying a force opposed to the preselected force, means releasably joining the carrier slide and the drive slide to provide combined movement thereof upon application of the opposing force until said opposing force exceeds said preselected force, means enabling further movement of the drive slide relative to the carrier slide when said opposing force exceeds said preselected force, and means in a welding circuit and adapted to the drive slide to energize said circuit upon said further movement of the drive slide.

4. In a resistance welding assembly, the combination of a welding head including an aperture, a carrier slide positioned in the aperture, a drive slide positioned in the aperture, a plurality of ball bearing assemblies, the carrier slide and the drive slide each being mounted on races of the ball bearing assemblies whereby said slides are free to move only with a linear reciprocal motion with respect to the head, compression means for maintaining a substantially constant compressive force on said slides by the ball bearing races, resilient means disposed between the carrier slide and the drive slide and having a preselected force urging the carrier slide and drive slide to move in opposite directions, means adapted to the drive slide for applying a force opposed to the preselected force, means releasably joining the carrier slide and the drive slide to provide combined movement thereof upon application of the opposing force until said opposing force exceeds said preselected force, means enabling further movement of the drive slide relative to the carrier slide when said opposing force exceeds said preselected force, and means in a welding circuit and adapted to the drive slide to energize said circuit upon said further movement of the drive slide.

5. In a resistance welding assembly as defined in claim 4, means engaging the resilient means for adjusting the magnitude of the preselected force.

6. A dual welding assembly comprising a welding head, a first carrier slide, a first electrode attached to the first carrier slide, means connecting the first carrier slide to the head so that the first carrier slide can only move with a linear reciprocal motion with respect to the head, a second carrier slide, a second electrode attached to the second carrier slide, means connecting the second carrier slide to the head so that it can only move with a linear reciprocal motion with respect to the head and parallel to the first carrier slide, third and fourth electrodes attached to the head, a drive slide, means connecting the drive slide to the head so that it can only move with a linear reciprocal motion with respect to the head and parallel to the first and second carrier slides, first and second resilient means disposed between the first carrier slide and the drive slide and between the second carrier slide and the drive slide, respectively, each resilient means having a separate preselected force urging each carrier slide to move in an opposite direction from the drive slide, means adapted to the drive slide for applying a force opposed to the preselected force, first and second means releasably joining each carrier slide and the drive slide, respectively, to provide combined movement thereof upon application of the opposing force until said opposing force exceeds the respective preselected force, means enabling further movement of the drive slide relative to each carrier slide when said opposing force exceeds the respective preselected force, and means in a welding circuit and adapted to the drive slide to energize said circuit upon said further movement of the drive slide.

References Cited in the file of this patent
UNITED STATES PATENTS

| | | |
|---|---|---|
| 1,673,500 | Dwyer | June 12, 1928 |
| 2,263,740 | Sample | Nov. 25, 1941 |
| 2,750,484 | Ewald | June 12, 1956 |
| 2,810,062 | Kaunitz | Oct. 15, 1957 |
| 2,872,564 | Du Fresne | Feb. 13, 1959 |